Oct. 24, 1944.
T. W. EVANS ET AL
2,360,859
SOLVENT EXTRACTION PROCESS
Filed Feb. 8, 1943
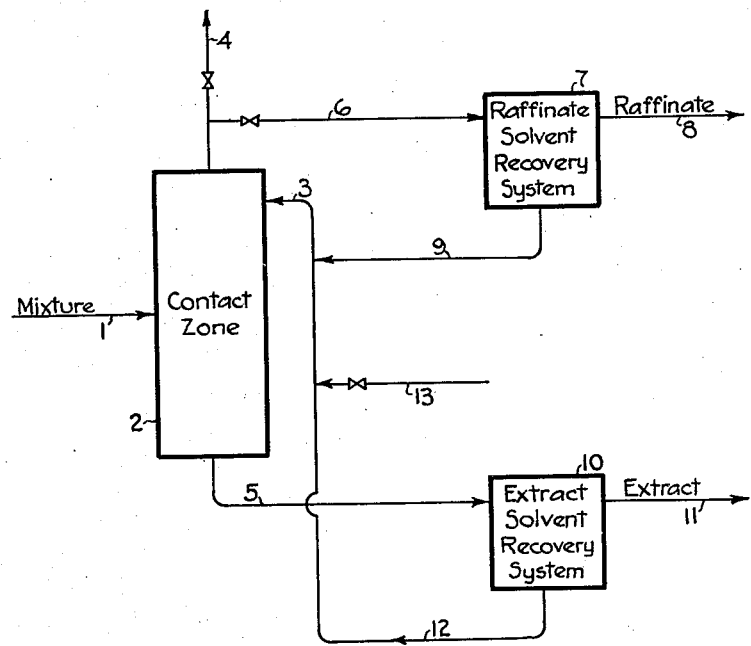
Inventors: Theodore W. Evans
Rupert C. Morris
By their Attorney:

UNITED STATES PATENT OFFICE 2,360,859

SOLVENT EXTRACTION PROCESS

Theodore W. Evans, Oakland, and Rupert C. Morris, Berkeley, Calif., assignors to Shell Development Company, San Francisco, Calif., a corporation of Delaware Application February 8, 1943, Serial No. 475,208

24 Claims. (Cl. 196—13)

This invention relates to a process for separating mixtures of two or more compounds by extraction with a selective solvent comprising a sulfolane. The compound sulfolane has the formula

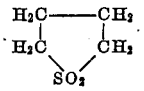

Its derivatives are compounds wherein one or more of the hydrogen atoms is replaced by an organic radical which may contain a polar grouping and more specifically may contain oxygen, nitrogen, sulfur and/or halide atoms. In hydrocarbon-substituted sulfolanes the hydrocarbon radicals are preferably alkyl radicals. Sulfolane derivatives containing oxygen include hydroxy sulfolanes, sulfolanyl-ethers and -esters; sulfolane derivatives containing nitrogen include sulfolanyl-amines, -nitriles and nitro sulfolanes; sulfolane derivatives containing sulfur include sulfolanyl sulfides, -sulfoxides and -sulfones. Other sulfolane derivatives may contain halide radicals, inorganic esters or mixed radicals of those above mentioned, such as acid amides, halohydrins, sulfonamides, etc. To meet stability requirements, these organic substitution radicals should contain not more than one olefinic double bond and preferably none. Derivatives may be made by condensing a conjugated diolefin with sulfur dioxide, and then subjecting the resultant product to hydrogenation, alkylation, hydration, amination, chlorination, nitration and/or other substitution or addition reactions.

Previously, certain aliphatic sulfones such as dipropyl sulfone and dibutyl sulfone have been employed in the separation of naphthenic hydrocarbons from paraffinic hydrocarbons by liquid-liquid extraction, but it has now been discovered that the sulfolanes (which are heterocyclic sulfones) have superior selectivity and a much wider application than the aliphatic sulfones. Sulfolanes are highly effective in both liquid-liquid and vapor-liquid extraction processes and for the separation of many different types of mixtures other than hydrocarbon mixtures, as will be described later.

It is the broad purpose of this invention to separate mixtures of different compounds economically, efficiently and effectively by solvent extraction. Specific purposes are, among others, to produce pure compounds, desulfurize and increase the viscosity index of hydrocarbon mixtures, dehydrate wet compounds, separate components of constant boiling mixtures or of mixtures having boiling points closer than, say, 10° C., or of isomeric mixtures, or mixtures of similar organic compounds having different degrees of saturation, or of other mixtures otherwise difficultly separable.

Generally, the process of this invention comprises the steps of (A) contacting the mixture to be separated either in the liquid or the vapor state with a liquid selective solvent to produce a raffinate phase and an extract phase, (B) separating the two phases from each other, and (C) removing the solvent from at least one of said phases to produce a raffinate and/or an extract and, usually, also recovering the solvent removed for further contact with more of said mixture. These steps, common to all solvent extraction processes, both liquid-liquid and vapor-liquid (including extractive distillation), may be carried out in any suitable manner known to those skilled in the art.

Many different types of mixtures of compounds may be separated by the selective solvents of this invention, provided the mixtures are inert toward the solvent, and the presence of the solvent in the mixture causes a greater change in the "escaping tendency" of one component of the mixture relative to that of other components. By "escaping tendency" is meant the potential of one component to pass from one phase to another. Thus the selective solvents of this invention are effective for the isolation of pure compounds, the separation of isomers, various purification processes, such as desulfurization and dehydration, the separation of mixtures forming azeotropes, or the separation of mixtures of organic compounds of different degrees of saturation, for instance to concentrate different types of hydrocarbons in different fractions, examples being the separation of aromatics, polyolefins, olefins, naphthenes, and paraffins from various hydrocarbon mixtures containing them.

Some specific examples of mixtures which may be separated by the selective solvents of this invention are hydrocarbon mixtures such as ethane and ethylene; propane and propylene; butane, isobutane, alpha-, beta- and iso-butylenes, butadiene, vinyl acetylene, ethyl acetylene; pentanes, pentenes, isoprene and piperylene; hexanes and hexenes; gasoline distillates containing benzene, toluene, xylenes, ethyl benzene, mesitylene, cumene, etc.; ortho and paraxylene; naphthenes and paraffins, gasoline, kerosene, fuel oils, lubricating oils, etc.; halogenated hydrocarbons including ortho and para chloronitrobenzene; etc. Other mixtures which may be separated are those of organic substances containing water, such as aqueous alcohols including methyl, ethyl, propyl, etc. alcohols; glycols; glycerines; chlorhydrins; organic acids including acetic, propionic, lactic, etc. acids; esters including isopropyl acetate; etc. Still other mixtures are those of oxy organic compounds such as ortho and para nitrophenol; ortho and para methoxy phenol; ortho and para dihydroxy benzene; glycol chlorhydrin and glycol; glycol and glycol ethers; ethyl acetate and ethyl alcohol; nitroglycerine and glycerine; primary and secondary butyl alcohols; alkyl phenols such as ortho, meta and para cresols; ortho and para-hydroxy benzaldehyde; ortho and para ethoxy aniline; ortho and paravanillin; methyl propyl ketone and diethyl ketone; mixtures of resorcin, pyrocatechine and hydroquinone; terpenes or sesquiterpenes from oxygen-containing compounds such as alcohols or aldehydes present therein; etc. Other organic mixtures are those produced in various chemical industrial processes of the coal, lignite and petroleum industries such as organic sulfur compounds, including mercaptans, mixtures of phenols and thiophenols; essential oils; fatty oils including glyceride oils, such as linseed, soya bean, fish, perilla, cottonseed, etc.; mono-, di- and tri-methylamines; isoprene and methyl formate; isophorone and xylidine; isophorone and xylenol; organic acids such as methyl succinic acid and glutaric acid; various fatty acids including stearic, oleic, linoleic, etc. acids; rosins and various synthetic resins; propane-1-1-dicarboxylic acid and propane-1-3-dicarboxylic acid; ortho and para cetyl benzol sulfonic acid; etc.

It may be noted that all the above mixtures are of a type which are at least partially soluble in the commonly known selective solvents which have preferential solvent power for aromatic over paraffinic hydrocarbons.

The sulfolanes of this invention may be employed as selective solvents by themselves singly or as mixtures of two or more; or in aqueous solutions; or together with auxiliary commonly known selective solvents or anti-solvents, provided they do not react with the particular sulfolane employed and are stable under the temperature conditions of the process.

The sulfolane should not crystallize out of solution at the highest concentration which may occur at any point in the process and at a temperature above about 150° C. It is desirable that it melt at a temperature not greater than 150° C. and preferably below 100° C., and it is further desirable that it be not more than 50% by weight soluble at room temperature in kerosene having a Watson characterization factor of at least 12 (see Industrial and Engineering Chemistry, vol. 27, page 1460, December 1935, "Characterizations of petroleum fractions," by K. M. Watson, E. F. Nelson and George B. Murphy). Higher solubility in such a kerosene frequently is an indication of poor selectivity.

Some suitable specific sulfolanes are: sulfolane, hydrocarbon-substituted sulfolanes such as alkyl sulfolanes preferably containing not more than about 14 carbon atoms; hydroxy sulfolanes such as 3-sulfolanol, 2-sulfolanol, 3-methyl-4-sulfolanol, 3-4-sulfolanediol, etc.; sulfolanyl ethers such as methyl-3-, propyl-3-, allyl-3-, butyl-3-, crotyl-3-, isobutyl-3-, methallyl-3-, methyl vinyl carbinyl-3-, amyl-3-, hexyl-3-, octyl-3-, nonyl-3-, glycerol alpha-gamma-diallyl-beta-3, tetrahydrofurfuryl-3, 3,3,5-tetramethyl-cyclohexyl-3-, m-cresyl-3-sulfolanyl ethers, corresponding 2-sulfolanyl ethers, disulfolanyl ethers, etc.; sulfolanyl esters such as 3-sulfolanyl actetate, 3-sulfolanyl-caproate, -laurate, -palmitate, -stearate, -oleate, -propionate, -butyrate, etc.; N-sulfolanes such as 3-sulfolanylamine, N-methyl-, N-ethyl-, N-N-dimethyl-, N-allyl-, N-butyl-, N-octyl-3-sulfolanyl-amines, etc.; sulfolanyl sulfides such as ethyl-3-tertiary butyl-3-, isobutyl-3-, methallyl-3-sulfolanyl sulfides, di-3-sulfolanyl sulfide, etc.; sulfolanyl sulfones such as methyl-3-, ethyl-3-, propyl-3-, amyl-3-sulfolanyl sulfones; sulfolanyl halides such as 3-chloro-, 3-4-dichloro-, 3-chloro-4-methyl sulfolanes, etc.; and mixed sulfolanes such as 4-chloro-3-sulfolanol, 4-chloro-3-sulfolanyl acetate, 3-sulfolanyl amine hydrochloride, N(3-sulfolanyl) acetamide, etc.

Of the sulfolanes useful in this invention, some are more heat-stable than others; thus, in particular, the halogen, amine, acid, some aldehyde, and some ester derivatives are relatively heat-unstable. Some may begin to decompose at temperatures as low as 150° C. Other sulfolanes, on the other hand, are extremely heat-stable even at temperatures as high as 300° C.

Some commonly known solvents, selective solvents and/or modifying agents which may be employed in conjunction with the sulfolanes include: water, various mono- and poly-hydric alcohols such as methanol, ethanol, propanol, furfuryl alcohol, benzyl alcohol, glycols, glycerols, etc.; various ketones such as acetone, methyl ethyl ketone, diethyl ketone, cyclopentanone, benzophenone, phenyl tolyl ketone, diphenylene ketone, etc.; various aldehydes such as crotonaldehyde, acrolein, furfural, etc.; ethers such as ethylene glycol and diethylene glycol mono-alkyl ethers, mono- and di-glyceryl ethers, glyceryl diethers, chlorinated dialkyl ethers (e. g. beta-beta-dichlorethyl ether), dioxane, etc.; lower aliphatic acids such as formic, acetic, propionic acids, acetic anhydride, etc.; esters such as benzoic, phthalic acid esters, etc.; phenol, cresylic acids, alkyl phenol mixtures, naphthols, alkyl naphthols, etc.; liquid ammonia, various organic amines such as lower aliphatic primary amines having one to eight carbon atoms, aniline, alkyl anilines, morpholine, diphenyl amine, ditolylamine, etc.; various nitriles such as acetonitrile, propionitrile, lactonitrile, butyronitrile, benzonitrile, etc.; various nitro hydrocarbons such as nitromethane, nitroethane, nitrobenzene, nitrotoluene, nitroxylenes, etc.; various pyridines and quinolines; liquid sulfur dioxide; various aromatic hydrocarbons such as benzene, toluene, naphthalene, etc.; various modifying salts such as those disclosed in U. S. Patent 2,246,257 to Kohn; and the like.

The sulfolane or the mixture of sulfolane with an auxiliary solvent must be at least partially miscible with the mixture to be separated under the conditions of the process.

Furthermore, anti-solvents may be employed together with the sulfolanes such as are employed in the DuoSol process for the extraction of lubricating oils. Some such anti-solvents include propane, butane, pentane, n-hexane; paraffinic gasoline, kerosene, gas oil, lubricating oil, various ethers, trichlorethylene, carbon tetrachloride, etc. Still further, compounds of two or more solvents together with one or more anti-solvents may also be employed.

The amount of auxiliary or anti-solvents which may be employed in conjunction with the sulfolanes to make up the solvent may range up to 90% by volume, preferably less than 50% by volume, of the solvent.

In determining whether a liquid-liquid or vapor-liquid extraction should be employed in any given case, both the natures of the mixture and of the sulfolane must be considered. As to the mixtures, those having high viscosities and high boiling points, or those chemically or physically unstable at high temperatures, or those which react with the solvent at high temperatures, should be extracted while in the liquid state. As to the sulfolanes, those containing polar substitution radicals are in general less heat-stable than the hydrocarbon sulfolanes. Therefore it is preferable in general to employ the former in low temperature extraction processes only.

In liquid-liquid solvent extraction the temperature generally may range within wide limits, provided it is above the melting temperature of the solvent and below the boiling temperature of both the mixture and the solvent under the pressure conditions of operation of the process. For example, if a very volatile mixture is being separated, a relatively high pressure and/or low temperature are required, while if a very viscous and high boiling mixture is being separated, higher temperature and lower pressure are normally more advantageous. Thus, the temperature may range between about −50° C. and about +300° C. and the pressure between about atmospheric and 500 p. s. i.

In vapor-liquid solvent extraction such as extractive distillation the general temperature range, though wide, is higher for the same mixtures than in liquid-liquid extraction. It is above the bubble temperature of the mixture and below the boiling temperature of the solvent under the pressure maintained in the process. If a normally gaseous mixture is separated by extractive distillation, a relatively low temperature may be employed, while if a normally liquid mixture is separated by the same process a higher temperature is usually required. Subatmospheric pressure may be resorted to in order to reduce the temperature if the mixture is thermally unstable at higher temperatures. Suitable temperatures may range from above about −50° C. or the bubble temperature of the mixture (whichever is higher), up to about +350° C., at pressures from about .1 p. s. i. absolute up to about 500 lbs. p. s. i. or higher.

Useful solvent-to-mixture ratios may range from about ½ to 20 by volume, preferably not more than 10.

The accompanying drawing is a general flow diagram of a solvent extraction process.

A mixture to be separated is introduced in either the liquid or the vapor state through line 1 into contact zone 2 and admixed with a sulfolane introduced into the same zone through a separate line 3. This is the first step (A) in all solvent extraction processes and may comprise either a bubble plate mixer, an impinging jet mixer, an agitation vessel, a plate column, or a packed tower.

In the contacting zone the mixture and sulfolane are caused to produce a raffinate phase and an extract phase which are separately withdrawn respectively through lines 4 and 5. This is the second step (B) of all solvent extraction processes, namely the separation of two phases produced in the contacting zone, and may be effected by distillation, settling, decantation, or centrifuging.

The third step (C) (common to all solvent extraction processes) comprises the recovery of sulfolane from one or both phases. In vapor-liquid extraction processes the raffinate phase may be substantially free of sulfolane and may be withdrawn directly through line 4; but if enough solvent is present to warrant its recovery the raffinate phase is passed through line 6 into the raffinate solvent recovery system 7 to produce a solvent-free raffinate, which is withdrawn through line 8, and recovered sulfolane which is withdrawn through line 9 and preferably joined to line 3 of sulfolane entering contact zone 2. This recovery system may comprise a crystallization chamber, distillation column, or a washing column. If the sulfolane is washed from the raffinate phase an additional step for its recovery is necessary, such as distillation, to separate the sulfolane from the wash solvent.

The extract phase is introduced into a solvent recovery system 10, which is similar to recovery system 7. From recovery system 10 a solvent-free extract is withdrawn through line 11 and the recovered sulfolane is withdrawn through line 12 and joined to line 3 for recontact with more of the mixture in contact zone 2. Fresh sulfolane may be added to the system from time to time through line 13 as required.

*Example I*

The following comparative tests show the usefulness of sulfolane in liquid-liquid solvent extraction of low boiling hydrocarbon mixtures. For comparison, two commonly used solvents are also shown.

A toluene concentrate obtained from petroleum distillate having a true boiling range between 95° C. and 115° C. and a toluene content of 10.9% by weight was admixed in a vessel at room temperature with an equal volume of each of the solvents shown in the table below. Two liquid phases were formed. Each phase was water-washed to remove the solvent and then tested to determine the weight percent of toluene in each phase. From the resulting data the distribution ratio K was calculated for toluene, K being the weight percent of toluene in the extract phase divided by the weight percent of toluene in the raffinate phase. Results were as follows:

| Solvent used | Wt. percent toluene | | Wt. percent recovery of toluene | Distribution ratio K |
|---|---|---|---|---|
| | Raffinate | Extract | | |
| Sulfolane | 8.3 | 68.5 | 27 | 8.26 |
| Furfural | 7.9 | 34.7 | 35.0 | 4.29 |
| Liquid SO$_2$ (at 14° C.) | | | | 3.19 |

*Example II*

Samples of a mixture having a refractive index of 1.4603 and consisting of equal parts by volume of benzene and cyclohexane were admixed respectively with an equal volume of methyl-3-sulfolanyl ether, and an equal volume of methyl-3-sulfolanyl ether plus 1/10 of its volume of water. In each case two liquid phases were formed. Each phase was separated from the methyl-3-sulfolanyl ether by water washing and then tested to determine the refractive index from which was calculated the percent by volume of benzene in each phase.

| Solvent | Refractive index | | Percent benzene | |
|---|---|---|---|---|
| | Raffinate | Extract | Raffinate | Extract |
| Methyl-3-sulfolanyl ether | 1.4478 | 1.4811 | 34 | 76 |
| Methyl-3-sulfolanyl ether plus 10 % water | 1.4559 | 1.4908 | 45 | 88 |

*Example III*

A sample of crude benzol obtained from coal tar containing 96.3% benzene was purified by a "Duo-Sol" process. The sample was admixed in a vessel at room temperature with 4.3 times its weight of sulfolane containing 20% water and .35 times its weight of isopentane. Two liquid phases were formed, which were separated. The isopentane, sulfolane and water were removed from both phases by distillation and water washing and the recovered oils were then analyzed. The raffinate-oil contained 92.5% by weight benzene and the extract oil contained 98.3% by weight benzene with 70% recovery of the total benzene.

*Example IV*

Samples of a mixture of 5 parts benzene and 5 parts cyclohexane having a refractive index of 1.4603 were admixed with equal volumes of each of the sulfolanes shown in the following table. In every case two liquid phases were formed. Each phase was separated from the solvent by the means shown in the table and then tested to determine the refractive index, from which was calculated the percent by volume of benzene in each phase.

this bomb was withdrawn into a sampling tube and the solvent contained in said vapor was removed by shaking with hydroxylamine hydrochloride. The remaining solvent-free vapor was analyzed for butane and butylene. The mol per cent of n-butane in the solvent-free liquid and the solvent-free vapor were 44.6% and 51.8%, respectively. From these results the volatility ratio was calculated to be 1.33; volatility ratio, often called the "alpha value," being the ratio of the percent of n-butane in the vapor to the percent of n-butane in the liquid, divided by the ratio of the percent of 2-butylene in the vapor to the percent of 2-butylene in the liquid. The alpha value for the n-butane and 2-butylene not in the presence of any solvent was 1.06.

The difference in alpha values obtained with and without solvent is a direct measure for the selectivity of the solvent. The greater this difference, the greater the selectivity.

We claim as our invention:

1. In a solvent extraction process for separating

| Solvent | Method of separating solvent | Refractive index | | Per cent volume benzene | |
|---|---|---|---|---|---|
| | | Raffinate | Extract | Raffinate | Extract |
| N-N-dimethyl 3-sulfolanylamine | Washing with water | 1.4484 | 1.4732 | 35.5 | 67 |
| N-allyl 3-sulfolanylamine | do | 1.4489 | 1.4735 | 36 | 67 |
| Allyl 3-sulfolanyl ether | do | 1.4464 | 1.4793 | 33 | 74 |
| 3-sulfolanylacetate | Washing with 5% NaOH. | 1.4538 | 1.4768 | 43 | 71 |
| Ethyl 3-sulfolanyl sulfide | Fractional distillation. | 1.4448 | 1.4652 | 30 | 57 |

*Example V*

A petroleum distillate having a boiling range of between 90° C. and 115° C. and containing 4.98% by weight of mercaptans calculated as amyl mercaptans, was admixed at room temperature with an equal volume of ethyl-3-sulfolanyl sulfide. Two liquid phases were produced which were separated and analyzed for mercaptans. The raffinate phase contained 3.56% by weight mercaptans and the extract phase contained 1.43% mercaptans; 28.7% of the total mercaptans being removed in a single stage liquid-liquid extraction.

*Example VI*

A mixture of toluene (boiling point=110.6° C.) and paraffins having about the same boiling range as toluene was admixed in a vessel with 50% by weight of ethyl 3-sulfolanyl sulfide. The mixture was then heated until the vapor above the liquid was in equilibrium with the liquid, and a sample of the vapor was separated and condensed. The ethyl 3-sulfanyl sulfide was then removed from the resulting liquid and condensate by water washing, and the sulfide-free phases were found to contain 54.1% and 35.2% toluene, respectively. From these data the volatility ratio of toluene to paraffin in the presence of ethyl 3-sulfolanyl sulfide was calculated to be 2.18. The volatility ratio, often called the alpha value, is the ratio of the percent of paraffins in the vapor to the percent of paraffins in the liquid, divided by the ratio of the percent of toluene in the vapor to the percent of toluene in the liquid.

*Example VII*

A sample of a mixture of normal butane and 2-butylene was placed in a previously evacuated bomb with 3 times its weight of a solvent consisting of 25% by weight sulfolane in methyl ethyl ketone and stirred at 120 p. s. i. absolute pressure and at 96.8° C. temperature. Vapor from a mixture of different organic compounds the steps comprising contacting said mixture with a sulfolane which is liquid and stable at the temperature of contacting to produce an extract phase and a raffinate phase, and separating said phases.

2. The process of claim 1 wherein the mixture comprises predominantly hydrocarbons.

3. The process of claim 1 wherein the mixture consists of hydrocarbons of different degrees of saturation.

4. The process of claim 1 wherein said sulfolane has a melting temperature less than 150° C.

5. The process of claim 1 wherein said fulfolane at room temperature is less than 50% by weight soluble in kerosene having a Watson characterization factor of at least 12.

6. The process of claim 1 wherein said sulfolane is unsubstituted sulfolane.

7. The process of claim 1 wherein said sulfolane is a substituted sulfolane, the radicals comprising an element selected from the group consisting of O, N, S and halogens.

8. The process of claim 1 wherein said sulfolane is a sulfolanyl ether.

9. The process of claim 1 wherein said sulfolane is a sulfolanyl sulfide.

10. In a solvent extraction process for separating a mixture of different organic compounds, the steps comprising contacting said mixture with a sulfolane which is liquid and stable at the temperature of contacting to produce an extract phase and a raffinate phase, separating said phases, recovering said sulfolane and returning the recovered sulfolane for further contact with more of said mixture.

11. In a solvent extraction process for separating a mixture of organic compounds, the steps comprising contacting said mixture with a selective solvent to produce two phases and separating said phases, said selective solvent comprising not less than 10% by volume of a sulfolane which is liquid and stable at the temperature of contacting.

12. The process of claim 11 wherein the solvent comprises more than 50% by volume of said sulfolane.

13. The process of claim 11 wherein the solvent-mixture ratio ranges between ½ and 20 by volume.

14. In a solvent extraction process for the separation of a liquid mixture of different organic compounds, the steps comprising contacting said mixture with a sulfolane which is liquid and stable at the temperature of contacting to produce an extract phase and a raffinate phase and separating said phases, said temperature of contacting being above the melting temperature of said sulfolane and below the boiling temperatures of said mixture and said sulfolane.

15. In a solvent extraction process for separating a vaporizable liquid mixture of organic compounds, the steps comprising contacting said mixture with a sulfolane which has a higher boiling temperature than that of said mixture and which is stable at the temperature of contacting to produce an extract phase and a raffinate phase, separating said phases and recovering said sulfolane from at least one of said phases, said temperature of contacting being above the bubble temperature of said mixture and below the boiling temperature of said sulfolane.

16. The process of claim 1 wherein said mixture consists essentially of $C_5$ hydrocarbons comprising olefins and diolefins.

17. The process of claim 1 wherein said mixture consists essentially of $C_4$ hydrocarbons comprising olefins and diolefins.

18. In an extractive distillation process for separating a mixture of vaporizable organic compounds, the steps comprising contacting vapors of said mixture with a liquid solvent comprising a sulfolane to produce two phases and separating said phases.

19. In a solvent extraction process for desulfurizing an organic petroleum oil containing organic sulfur compounds, the steps comprising contacting said oil with a liquid solvent comprising a sulfolane to produce a raffinate phase and an extract phase, said raffinate phase containing a lower concentration of said sulfur compounds than said oil and said extract phase containing a higher concentration of said sulfur compounds than said oil, and separating said phases.

20. In a process for separating a mixture of hydrocarbons comprising aromatics and non-aromatics, the steps comprising contacting said mixture with a liquid solvent comprising a sulfolane to produce a raffinate phase and an extract phase, and separating said phases and recovering said solvent to produce a raffinate and an extract, said raffinate containing said non-aromatics and said extract containing said aromatics.

21. In a process for separating a mixture of hydrocarbons comprising di-olefins and more saturated hydrocarbons, the steps comprising contacting said mixture with a liquid solvent comprising a sulfolane to produce a raffinate phase and an extract phase, and separating said phases and recovering said solvent to produce a raffinate and an extract, said raffinate containing said more saturated hydrocarbons and said extract containing said di-olefins.

22. The process of claim 1 wherein said mixture is an azeotrope.

23. In a solvent extraction process for separating a mixture of water immiscible organic compounds, the steps comprising contacting said mixture with a liquid solvent comprising a sulfolane to produce two phases, separating said phases, and separating said solvent from at least one of said phases by water washing.

24. In a solvent extraction process for separating a vaporizable mixture of organic compounds, the steps comprising contacting said mixture with a liquid solvent comprising a sulfolane to produce two phases, said solvent boiling substantially above the end boiling point of said mixture, separating said phases and separating said solvent from at least one of said phases by fractional distillation.

THEODORE W. EVANS.
RUPERT C. MORRIS.